(12) United States Patent
Hempel et al.

(10) Patent No.: US 6,210,095 B1
(45) Date of Patent: Apr. 3, 2001

(54) CARPET LOADING SYSTEM

(76) Inventors: Paul Hempel, P.O. Box 78; Keith Allen, Box 26, both of Christine, ND (US) 58015

( * ) Notice: Subject to any disclaimer, the term of this patent is extended or adjusted under 35 U.S.C. 154(b) by 0 days.

(21) Appl. No.: 09/090,814

(22) Filed: Jun. 4, 1998

(51) Int. Cl.$^7$ ................................................ B62B 5/00
(52) U.S. Cl. .................... 414/490; 414/528; 414/911; 280/79.6; 280/47.131; 280/47.17; 180/366; 180/65.6; 180/19.1
(58) Field of Search ........................... 414/437, 439, 414/490, 679, 507, 539, 528, 467, 469, 911, 537, 430; 280/79.6, 47.131, 47.17, 47.19, 47.24; 180/14.2, 366, 335, 279, 65.6, 19.1

(56) References Cited

U.S. PATENT DOCUMENTS

| | | |
|---|---|---|
| 26,421 | 12/1859 | Fancher . |
| 1,378,631 | 5/1921 | Stone . |
| 1,602,112 | 10/1926 | Johnson . |
| 1,704,841 | 3/1929 | Sacerdote . |
| 1,708,854 | 4/1929 | Stahlhut . |
| 2,572,945 | 10/1951 | Quesnoit . |
| 3,913,762 | 10/1975 | Alexander . |
| 4,130,172 * | 12/1978 | Moody ................ 180/65.6 |
| 4,321,004 * | 3/1982 | Mills ................... 414/490 |
| 4,441,848 * | 4/1984 | Bailey ................. 414/439 |
| 4,824,313 | 4/1989 | Miller . |
| 5,108,250 * | 4/1992 | Fewin, Jr. et al. ......... 414/528 |
| 5,190,304 * | 3/1993 | Prentiss et al. .......... 414/490 |
| 5,195,762 * | 3/1993 | Pressly ................. 414/490 |
| 5,253,972 | 10/1993 | Drew et al. . |
| 5,433,576 | 7/1995 | Drew . |
| 5,468,010 * | 11/1995 | Johnson ................ 414/490 |
| 5,685,385 * | 11/1997 | Sanuga ................. 180/65.6 |
| 5,697,760 * | 12/1997 | Rosen .................. 414/437 |
| 5,707,203 * | 1/1998 | Richter ................ 414/537 |
| 5,794,291 * | 8/1998 | Olaussen et al. .......... 414/537 |
| 5,899,466 * | 5/1999 | Twaits, Jr. ............. 414/537 |

FOREIGN PATENT DOCUMENTS

0250918 * 10/1987 (GE) ..................... 414/490

* cited by examiner

*Primary Examiner*—Robert P. Olszewski
(74) *Attorney, Agent, or Firm*—Micahel S. Neustel

(57) ABSTRACT

A carpet loading system for easily loading, transporting and unloading a roll of carpet without requiring significant physical exertion by an individual. The inventive device includes an elongated frame, a pair of rear wheels, a pair of front caster wheels, a plurality of support rollers rotatably attached within the frame, an endless belt surround the support rollers forming an inclined plane with respect to the ground, an elongated handle extending from the rear portion of the frame, a first motor driving the belt and a second motor driving the rear wheels. Preferably, a plurality of side rollers are positioned about the sides of the endless belt to prevent the carpet from rolling off of the cart during loading and transporting. The drive axle between the pair of rear wheels preferably has a differential to allow easy turning when a heavy carpet roll is placed thereupon. A stopping switch is preferably positioned at the end of the elongated handle to terminate power to the first motor when the carpet roll is substantially centered upon the frame.

18 Claims, 4 Drawing Sheets

CARPET LOADING SYSTEM

BACKGROUND OF THE INVENTION

1. Field of the Invention

The present invention relates generally to carpet loading devices and more specifically it relates to a carpet loading system for easily loading, transporting and unloading a roll of carpet without requiring significant physical exertion by an individual.

2. Description of the Prior Art

Carpet loading devices have been in use for years. Typically, these devices utilize winches or other complex mechanisms to load the carpet. Also, many carpet loading devices require significant physical exertion by the user to load, transport and unload the carpet. Hence, there is a need for a carpet loading system that can easily load, transport and unload a roll of carpet without requiring significant physical exertion by an individual.

Examples of carpet loading devices include U.S. Pat. No. 4,321,004 to Mills; U.S. Pat. No. 1,704,841 to Sacerdote; U.S. Pat. No. 1,602,112 to Johnson; U.S. Pat. No. 2,572,945 to Quesnoit; U.S. Pat. No. 26,421 to Fancher, U.S. Pat. No. 3,913,762 to Alexander; U.S. Pat. No. 5,433,576 to Drew; U.S. Pat. No. 1,708,854 to Stahlhut; U.S. Pat. No. 1,378,631 to Stone; U.S. Pat. No. 4,824,313 to Miller; U.S. Pat. No. 5,253,972 to Drew et al which are all illustrative of such prior art.

Mills (U.S. Pat. No. 4,321,004) discloses a self-loading carpet cart. Mills teaches an endless conveyor belt positioned about a frame with two wheels, and a winch system for engaging the carpet. Winch systems are not only dangerous, but are time consuming to operate. Further, winch systems cannot be utilized in enclosed areas where the rear portion of the carpet roll is against a wall or under a carpet rack. Mills also requires the use of a ramp that can snag the edge of the carpet roll thereby causing damage to the carpet roll and stopping the loading of carpet. The ramp also can get caught on cracks in concrete, ridges, gravel or dirt. Additionally, Mills does not teach a means for supporting the complete roll of carpet, which are typically 12 feet in length. Because there is no longitudinal support in Mills, a portion of the carpet roll typically sags downwardly during transportation thereby engaging the ground or other objects during transporting. The handles disclosed in Mills require significant physical exertion to manipulate and control the cart when loaded with a heavy carpet roll. Finally, Mills does not teach a means for automatically turning off the winch system when the carpet roll has been centered upon the cart.

While these devices may be suitable for the particular purpose to which they address, they are not as suitable for easily loading, transporting and unloading a roll of carpet without requiring significant physical exertion by an individual.

In these respects, the carpet loading system according to the present invention substantially departs from the conventional concepts and designs of the prior art, and in so doing provides an apparatus primarily developed for the purpose of easily loading, transporting and unloading a roll of carpet without requiring significant physical exertion by an individual.

SUMMARY OF THE INVENTION

A primary object of the present invention is to provide a carpet loading system that will overcome the shortcomings of the prior art devices.

Another object is to provide a carpet loading system that reduces the amount of physical exertion required from an individual operator.

An additional object is to provide a carpet loading system that requires only one individual to operate, thereby saving time and labor.

A further object is to provide a carpet loading system that is self-powered.

An additional object is to provide a carpet loading system that does not require the use of a front ramp or winch system to load a carpet roll.

Another object is to provide a carpet loading system that automatically stops loading a carpet roll when the carpet roll is centered.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the sane becomes better understood when considered in conjunction with the accompanying drawings, in which like reference characters designate the same or similar parts throughout the several views, and wherein.

DESCRIPTION OF THE PREFERRED EMBODIMENT

Figure 1:
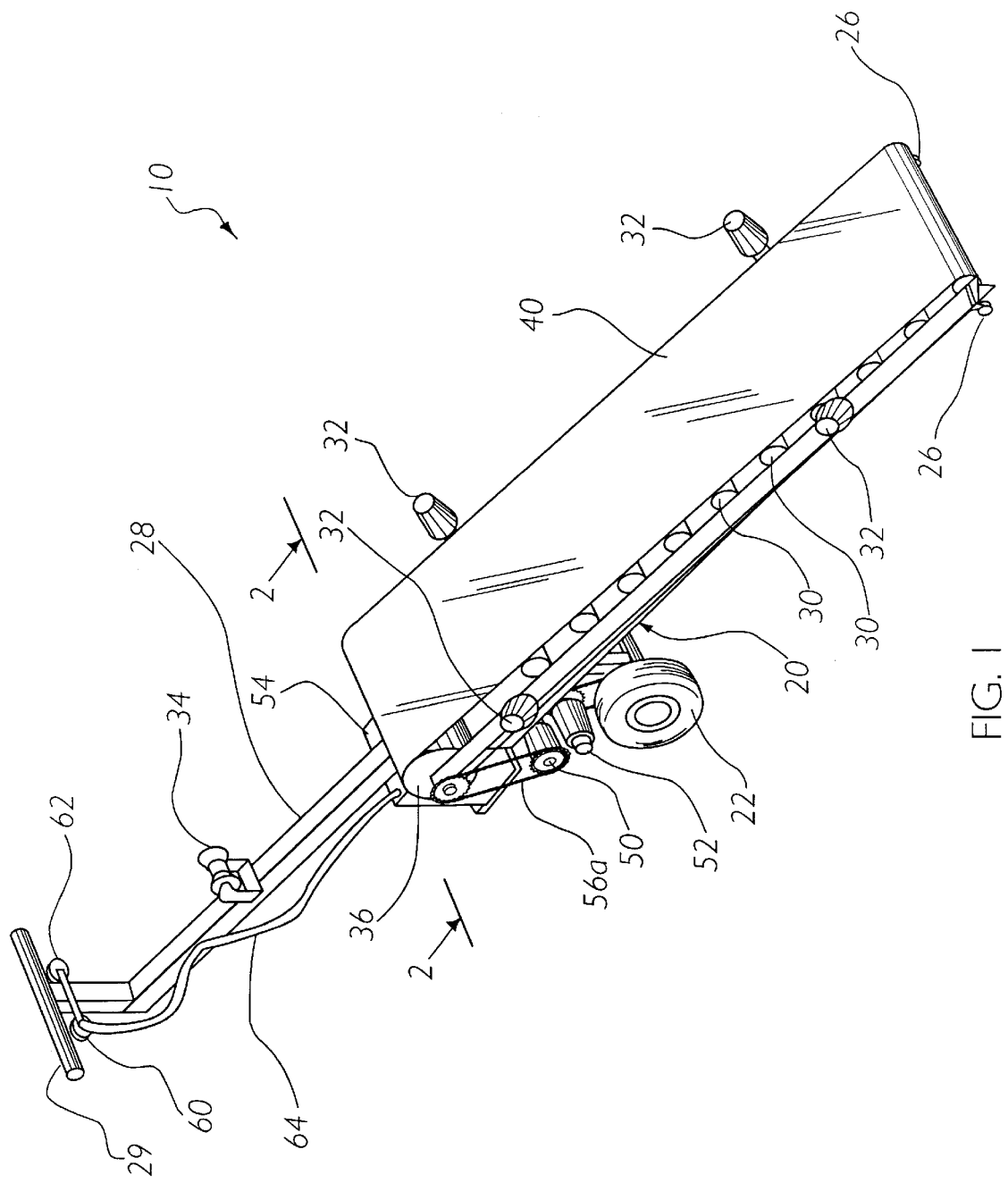
FIG. 1 is an upper perspective view of the present invention.

Turning now descriptively to the drawings, in which similar reference characters denote similar elements throughout the several view, FIGS. 1 through 4 illustrate a carpet loading system 10, which comprises an elongated frame 20, a pair of rear wheels 22, a pair of front caster wheels 26, a plurality of support rollers 30 rotatably attached within the frame 20, an endless belt 40 surround the support rollers 30 forming an inclined plane with respect to the ground, an elongated handle 28 extending from the rear portion of the frame 20, a first motor 50 driving the belt 40 and a second motor 52 driving the rear wheels 22. Preferably, a plurality of side rollers 32 are positioned about the sides of the endless belt 40 to prevent the carpet from rolling off of the cart during loading and transporting. The drive axle 24 between the pair of rear wheels 22 preferably has a differential 21 to allow easy turning when a heavy carpet roll 12 is placed thereupon. A safety switch is preferably positioned at the end of the elongated handle 28 to terminate power to the first motor 50 when the carpet roll 12 is substantially centered upon the frame 20.

Figure 3:
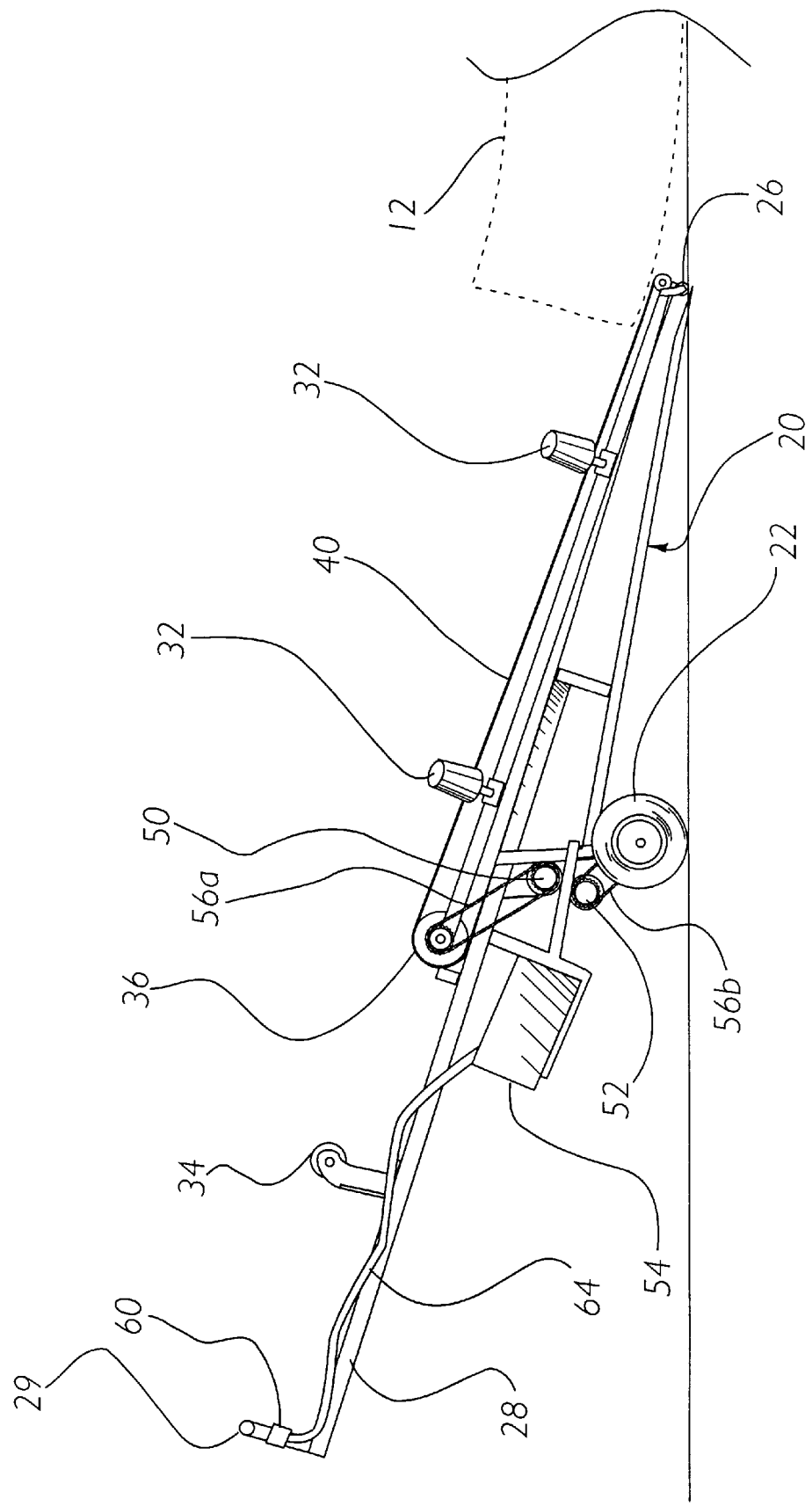
FIG. 3 is a side view of the present invention initially engaging a carpet roll.
Figure 4:
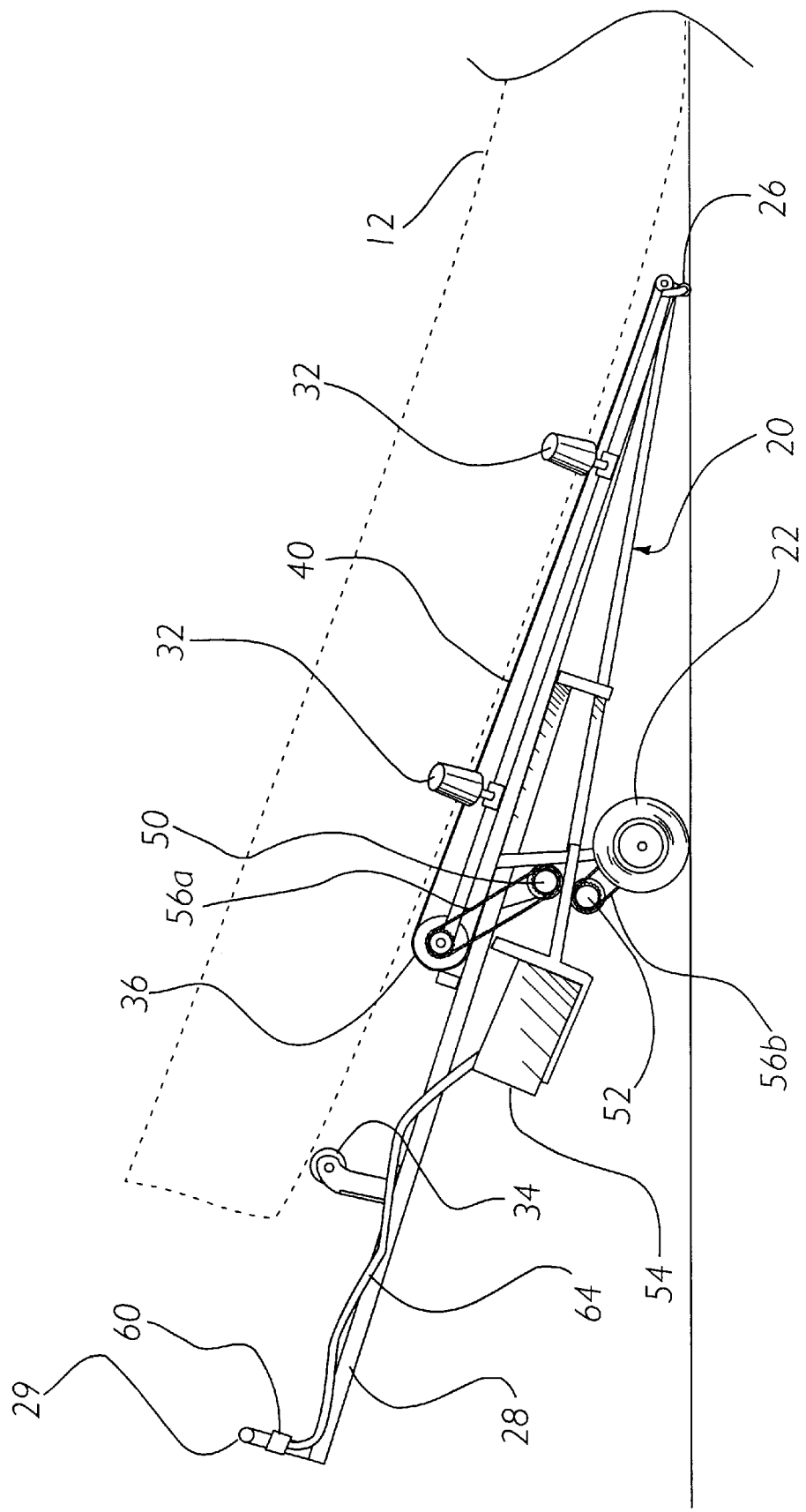
FIG. 4 is a side view of the present invention loading a carpet roll.

As best shown in FIG. 3 of the drawings, the side view of the frame 20 is substantially triangular shaped with the rear wheels 22 adjacent the broad end of the frame 20 that is also the center pivot point during transporting of the carpet roll 12. The pair of front caster wheels 26 are attached to the frame 20 opposite of the rear wheels 22 and allow the front edge of the endless belt 40 to be extremely close to the ground surface without engaging the ground surface. As shown in FIG. 1 of the drawings, the plurality of support rollers 30 are rotatably attached at opposite ends to unnumbered side members of the frame 20. The endless belt 40 is supported about the support rollers 30. As shown in FIGS. 1, 3 and 4 of the drawings, a rear roller 36 is attached to the rear portion of the frame 20. The rear roller 36 is preferably larger than the support rollers 30 since it drives the endless belt 40.

As shown in FIGS. 1 through 4 of the drawings, the first motor 50 is mechanically connected to the rear roller 36 by a chain 56a. Those skilled in the art can appreciate that various other connection means may be utilized such as belts, sprockets, or shafts.

Figure 2:
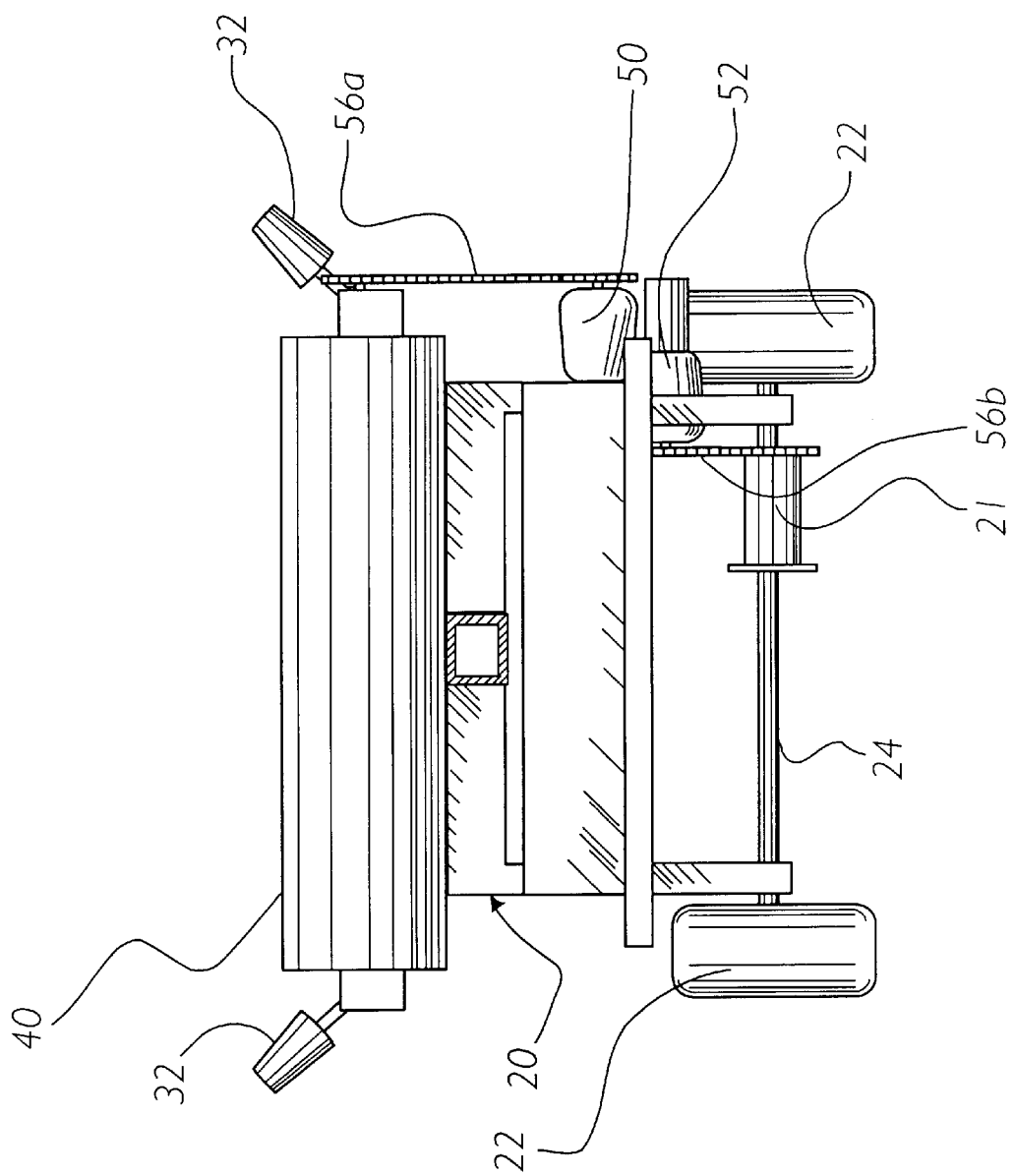
FIG. 2 is a cross sectional view taken along line 2—2 of FIG. 1.

As best shown in FIG. 2 of the drawings, a drive axle 24 extends between the pair of rear wheels 22. The second motor 52 is mechanically connected to the drive axle 24 by a chain 56b as best shown in FIG. 2. The drive axle 24 preferably includes a differential 21 to allow easy turning of the invention when loaded with a heavy carpet roll 12.

As best shown in FIGS. 3 and 4 of the drawings, the elongated handle 28 extends from the rear portion of the frame 20 substantially along a plane of the endless belt 40. The elongated handle 28 includes a T-member 29 at the distal end that is orthogonal to the longitudinal axis of the elongated handle 28. The elongated handle 28 is also capable of being extended to allow various sizes of carpet roll 12s to be loaded.

As shown in FIG. 1 of the drawings, a belt switch 60 and a drive switch 62 are attached to the upper portion of the T-member 29. The belt switch 60 and the drive switch 62 are electronically connected to a battery 54, the first motor 50 and a second motor 52 by a length of wire cable 64. The first motor 50 and the second motor 52 are preferably variable speed motors. The belt switch 60 controls the rotation and speed of the first motor 50 that drives the endless belt 40. The drive switch 62 controls the rotation and speed of the second motor 52 that drives the rear wheels 22. A safety switch is preferably attached to the T-member 29 and electrically connected in series with the belt switch 60 and the first motor 50 for terminating power to the first motor 50 if an end of the carpet roll 12 should engage the T-member 29 thereby preventing off-balancing of the invention during transportation.

As shown in FIGS. 1 through 4 of the drawings, two pairs of side rollers 32 are attached to the unnumbered side members of the frame 20 to retain the carpet roll 12 in the center of the invention during loading, transporting and unloading. The two pairs of side rollers 32 are preferably removable. A head roller 34 is preferably attached to the elongated handle 28 that rollably supports the carpet roll 12 during loading, transportation and unloading.

In use, the user grasping the T-member 29 positions the front edge of the endless belt 40 ear the carpet roll 12 to be loaded as shown in FIG. 3. The user manipulates the belt switch 60 so that the endless belt 40 is rotating to load the carpet roll 12 and then manipulates the drive switch 62 to cause the invention to go towards the carpet roll 12. The front edge of the endless belt 40 engages the lower portion of the carpet roll 12 and elevates the end of the carpet roll 12 until the bottom surface of the carpet roll 12 is on the top surface of the endless belt 40 as shown in FIG. 3. The rear wheels 22 move the frame 20 under the carpet roll 12 while the endless belt 40 pulls upon the carpet roll 12 as shown in FIG. 4 of the drawings. Once the end of the carpet roll 12 becomes adjacent to the T-member 29, the user can either manipulate the belt switch 60 to terminate power to the first motor 50 or the end of the carpet roll 12 will engage the safety switch thereby terminating power to the first motor 50. When the carpet roll 12 is fully loaded, the carpet roll 12 is substantially centered upon the invention that allows the user to manipulate the elongated handle 28 to elevate the front portion of the frame 20. The user then manipulates the elongated handle 28 to position the carpet roll 12 in the desired location. Once the carpet roll 12 is near the area to be unloaded, the user manipulates the belt switch 60 and the drive switch 62 to unload the carpet roll 12. When finished, the elongated handle 28 may be removed and the side rollers 32 may be removed so that the invention may be stored in a compact storage position upon a truck or building structure.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Index of Elements for Carpet Loading System
ENVIRONMENTAL ELEMENTS

10. Carpet Loading System
11.
12. Carpet Roll
13.
14.
15.
16.
17.
18.
19.
20. Frame
21. Differential
22. Rear Wheels
23.
24. Drive Axle
25.
26. Front Caster Wheels
27.
28. Elongated Handle
29. T-Member
30. Support Rollers
31.
32. Side Rollers
33.
34. Head Roller
35.

-continued

Index of Elements for Carpet Loading System
ENVIRONMENTAL ELEMENTS

36. Rear Roller
37.
38.
39.
40. Belt
41.
42.
43.
44.
45.
46.
47.
48.
49.
50. First Motor (Belt Motor)
51.
52. Second Motor (Wheels Motor)
53.
54. Battery
55.
56. Chain
57.
58.
59.
60. Belt Switch
61.
62. Drive Switch
63.
64. Cable
65.
66.
67.
68.
69.
70.
71.
72.
73.
74.
75.
76.
77.
78.
79.

We claim:

1. A carpet loading system comprising:
a frame having a front end, a center point and a rear end;
a pair of rear wheels attached to said frame;
a front support means attached adjacent said front end for retaining said front end slightly above a loading surface;
a conveyor means supported on said frame for moving a carpet roll lengthwise along a conveyor path, wherein a plane extending from said pair of rear wheels orthogonally intersects said conveyor path between said rear end and said center point for providing increased vertical forces upon said pair of rear wheels; and
a drive means for driving said rear wheels and said conveyor means.

2. The carpet loading system of claim 1, wherein said frame includes an elongated handle attached to said rear end.

3. The carpet loading system of claim 2, wherein a T-member is attached to a distal end of said elongated handle for allowing a user to grasp.

4. The carpet loading system of claim 3, wherein said front support means is a pair of wheels.

5. The carpet loading system of claim 4, including at least one pair of side rollers attached to said frame for retaining said carpet roll upon in a desired position.

6. The carpet loading system of claim 5, including a control panel connected to the drive means for allowing said user to control said drive means.

7. The carpet loading system of claim 6, wherein said control panel is attached to said T-member.

8. The carpet loading system of claim 7, including a safety switch attached to said T-member.

9. The carpet loading system of claim 8, wherein said elongated handle is adjustable in length to accommodate various sizes of said carpet roll.

10. The carpet loading system of claim 9, including a head roller attached to said elongated handle for supporting said carpet roll.

11. The carpet loading system of claim 10, wherein said pair of rear wheels are connected by a drive axle with a differential within.

12. The carpet loading system of claim 11, wherein said conveyor means comprises:
a plurality of support rollers journaled within said frame;
a rear roller journaled adjacent said rear end of said frame; and
an endless belt positioned about said plurality of support rollers and said rear roller.

13. The carpet loading system of claim 12, wherein said drive means comprises:
a first motor connected to said rear roller; and
a second motor connected to said drive axle.

14. The carpet loading system of claim 13, wherein said first motor and said second motor are electric motors and said control panel is electrically connected to a portable power supply.

15. The carpet loading system of claim 14, wherein said first motor and said second motor are variable speed motors.

16. A carpet loading system comprising:
a frame having a front end, a center point and a rear end;
at least one elongate handle attached to and extending substantially longitudinally from said rear end of said frame for providing and supporting control for the user and supporting a carpet roll;
a pair of rear wheels attached to said frame;
a front support means attached adjacent said front end for retaining said front end slightly above a loading surface;
a conveyor means supported on said frame for moving the carpet roll lengthwise along a conveyor path; and
a drive means for driving said rear wheels and said conveyor means.

17. The carpet loading system of claim 16, including a T-member attached to a distal end of said at least one elongate handle.

18. The carpet loading system of claim 17, including a control panel secured to said T-member and in communication with said drive means.

* * * * *